(12) United States Patent
Boettcher et al.

(10) Patent No.: US 10,303,137 B2
(45) Date of Patent: May 28, 2019

(54) STRUCTURE MODES FOR CONTROLLING VARIOUS SYSTEMS IN CLOSED ENVIRONMENTS

(71) Applicant: Google Inc., Mountain View, CA (US)

(72) Inventors: Jesse Boettcher, San Jose, CA (US); Lauren Von Dehsen, San Francisco, CA (US); Timo Bruck, Mountain View, CA (US); Prashant Reddy, Madison, NJ (US); Mark Malhotra, San Mateo, CO (US); Jason Lee, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 36 days.

(21) Appl. No.: 15/454,918

(22) Filed: Mar. 9, 2017

(65) Prior Publication Data

US 2017/0261957 A1 Sep. 14, 2017

Related U.S. Application Data

(60) Provisional application No. 62/305,927, filed on Mar. 9, 2016.

(51) Int. Cl.
*G05B 15/02* (2006.01)
(52) U.S. Cl.
CPC ...... *G05B 15/02* (2013.01); *G05B 2219/2614* (2013.01); *G05B 2219/2642* (2013.01)

(58) Field of Classification Search
CPC .............. G05B 19/048; G05B 19/0426; G05B 2219/2614; G05B 2219/2642
USPC ......................................................... 700/275
See application file for complete search history.

(56) References Cited

U.S. PATENT DOCUMENTS

| | | | | |
|---|---|---|---|---|
| 2005/0225442 | A1* | 10/2005 | Kanayama | G08B 25/008 340/539.13 |
| 2007/0177613 | A1* | 8/2007 | Shorty | H04L 29/06027 370/401 |
| 2009/0266904 | A1* | 10/2009 | Cohen | F24F 11/30 236/51 |
| 2015/0309483 | A1* | 10/2015 | Lyman | G05B 15/02 700/275 |
| 2016/0351045 | A1* | 12/2016 | Salter | H04W 4/021 |

* cited by examiner

*Primary Examiner* — Robert E Fennema
*Assistant Examiner* — Jigneshkumar C Patel
(74) *Attorney, Agent, or Firm* — Morris & Kamley LLP

(57) ABSTRACT

A controller is provided for coordinated control of various subsystems, such as a heating, ventilation, and air conditioning (HVAC) subsystem, a camera subsystem, and a security subsystem, in a structure such as a home, by allowing automatic as well as manual changes to be made to the subsystems within their respective constraints. The controller may change the states or settings of the subsystems automatically upon occurrences of certain conditions, or allow the user to change them by switching a structure mode for the subsystems between a home mode and an away mode. A change in the structure mode may effect changes to some or all of the states or settings for some or all of the subsystems.

17 Claims, 4 Drawing Sheets

FIG. 4
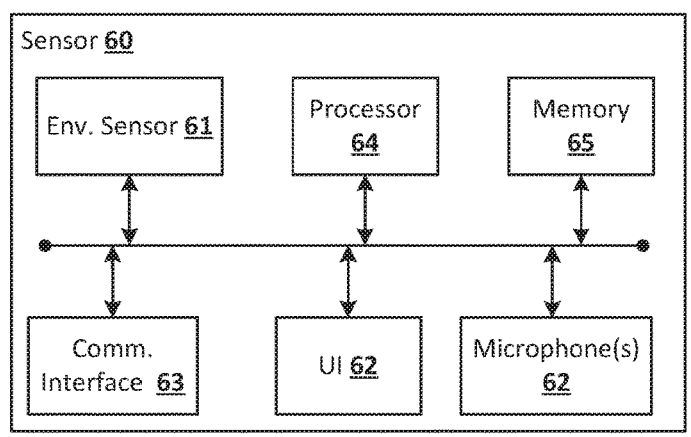
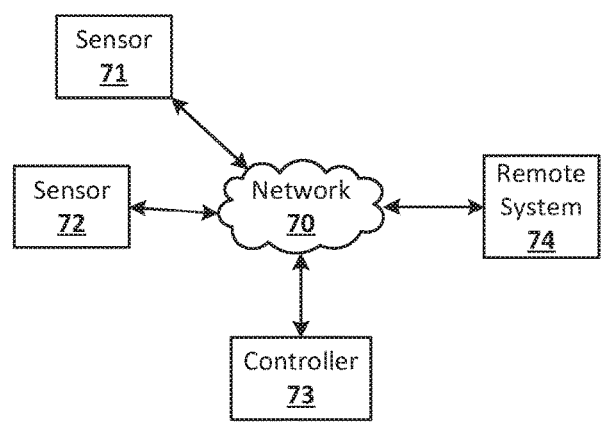
FIG. 5

STRUCTURE MODES FOR CONTROLLING VARIOUS SYSTEMS IN CLOSED ENVIRONMENTS

BACKGROUND

A structure for residential or business use may have a large number of systems, including, for example, a heating, ventilation, air conditioning system, cameras, security systems, or other types of electronic or electromechanical products or systems. Many of these systems may be operating simultaneously and independently from each other at a given time, and it may be an onerous burden for a user to control the state of each system separately and manually.

BRIEF SUMMARY

According to an embodiment of the disclosed subject matter, a method of controlling a plurality of subsystems in a structure is provided. The method includes transmitting a notification of a structure mode to a user device, the structure mode comprising a mode selected from the group consisting of at least a home mode and an away mode; changing the structure mode between the home mode and the away mode; and determining one or more settings of one or more of the plurality of subsystems based on whether the structure mode is the home mode or the away mode.

According to an embodiment of the disclosed subject matter, an apparatus for controlling a plurality of subsystems in a structure is provided. The apparatus includes a memory; and a processor communicably coupled to the memory, the processor configured to execute instructions to: transmit a notification of a structure mode to a user device, the structure mode comprising a mode selected from the group consisting of at least a home mode and an away mode; change the structure mode between the home mode and the away mode; and determine one or more settings of one or more of the plurality of subsystems based on whether the structure mode is the home mode or the away mode.

According to an embodiment of the disclosed subject matter, a system includes a plurality of subsystems in a structure; a controller communicably coupled to the plurality of subsystems, the controller configured to: transmit a notification of a structure mode to a user device, the structure mode comprising a mode selected from the group consisting of at least a home mode and an away mode; change the structure mode between the home mode and the away mode; and determine one or more settings of one or more of the plurality of subsystems based on whether the structure mode is the home mode or the away mode.

According to an embodiment of the disclosed subject matter, means for controlling subsystems in a structure are provided, which include means for transmitting a notification of a structure mode to a user device, the structure mode comprising a mode selected from the group consisting of at least a home mode and an away mode; means for changing the structure mode between the home mode and the away mode; and means for determining one or more settings of one or more of the plurality of subsystems based on whether the structure mode is the home mode or the away mode.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 4 shows an example of a sensor according to embodiments of the disclosed subject matter.

FIG. 5 shows an example of a sensor network according to embodiments of the disclosed subject matter.

DETAILED DESCRIPTION

Figure 1:
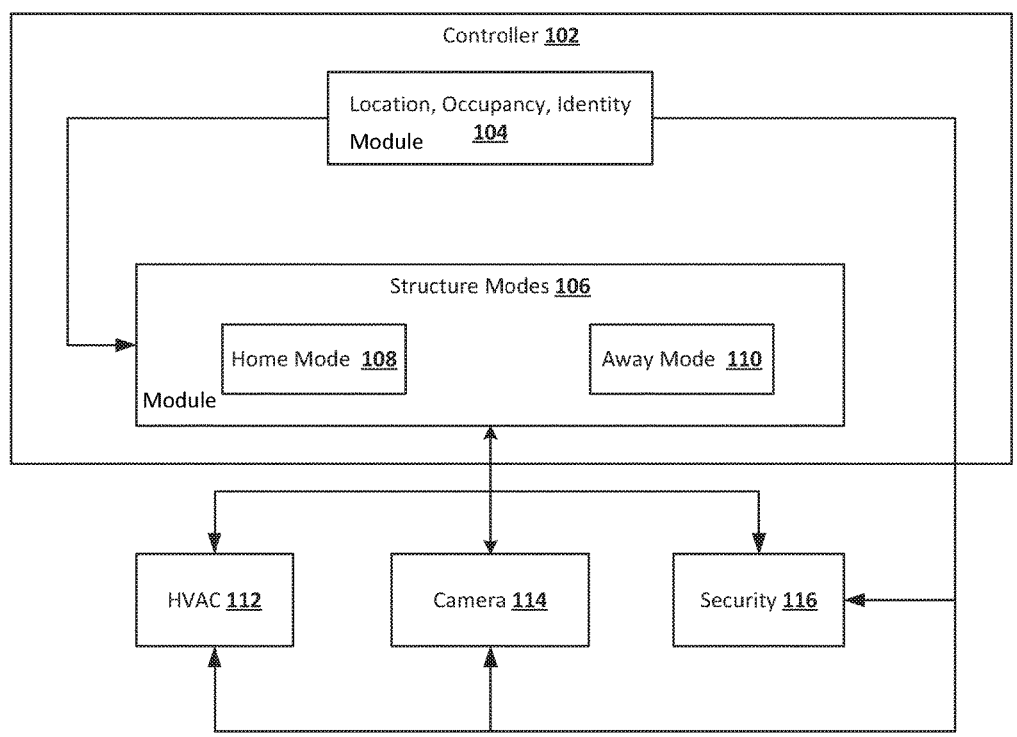
FIG. 1 shows an example of a system for coordinated control of various subsystems in a structure according to embodiments of the disclosed subject matter.

Depending on constraints on particular types of products and usages, some heating, ventilation, and air conditioning (HVAC) systems, cameras, security systems, or other products or systems may automatically change their settings or states based on various types of information, for example, information indicating whether people are at home or not, what they are doing, the identities of individuals at home, their daily schedule, their history of entering or exiting the home, or other information relating to their home occupancy. The states of products or systems may also be changed manually. In some instances, automatic changes to the states of some products or systems may require authorization or confirmation by a human user. In some instances, automatic changes may be effected without user input.

According to embodiments of the disclosed subject matter, a single point of control is provided for coordinated control of various subsystems in a structure such as a home, by allowing automatic as well as manual changes to be made to the subsystems within their respective constraints. In some implementations, a structure mode is implemented in a system which includes a single point of control for users to interact with multiple subsystems in the structure. Rather than manually changing the settings or states of the HVAC, camera, or security subsystem individually, the structure mode allows automatic changes to one or more states of one or more subsystems based on parameters such as user settings, histories of use, permissions, constraints, or the like, or manual changes by the user to switch between high-level modes, where each of the high-level modes allows automatic adjustments to the states or settings of various subsystems based on the above-mentioned parameters. High-level modes may be modes where the states of any of various lower-level subsystems can be altered by the change in a high-level mode.

In some implementations, an authorized user may control the various subsystems in the structure by using a mobile device, such as a cellular telephone, a smartphone or a smartwatch, for example, which may communicate with the subsystems through wireless connections, such as cellular or Wi-Fi, for example. In some implementations, the user may control the various subsystems by using a fixed device, such as a keypad, a touchscreen panel, or another device, inside or outside of the structure. A mobile device would allow the user to control the subsystems in a flexible manner, regardless of whether the user is inside, near, or far away from the structure.

In some implementations, the various subsystems in the structure may include a security subsystem, which may have security settings that affect one or more other subsystems. In an enclosed environment being monitored by the security subsystem, there may be multiple distinct security levels or distinct modes of operation for the security subsystem. Each security level may have its own criteria for authentication, intrusion detection/alarming, exit allowances, bypass, and other core security features. For example, a security subsystem for a structure may have three security levels (SL0, SL1, and SL2) with the following configurations:

SL0: Disarmed—To be used when no human activity should be deemed suspicious enough to trigger a siren.

SL1: Armed for perimeter—To be used when residents are expected to remain within the premises but not exiting or entering.

SL2: Armed for perimeter and motion—To be used when nobody is expected inside the premises and signs of activity should trigger the siren.

In some implementations, an "auto-ask" feature which includes a set of convenience features may be provided to remind users to make manual changes to the state of their home. In some implementations, a learning system may be provided which may indicate that a certain subsystem should be in a different state, but there is either insufficient confidence or a lack of authorization required to make automatic changes to the subsystems, based on patterns of prior usage or settings. In some instances, an actionable push notification may be transmitted to one or more mobile devices associated with authorized users to ask for confirmation or authorization to make recommended changes to the subsystems. In some instances, multiple users may be authorized to make changes. For example, for a home environment with multiple residents, more than one mobile device may be registered with a single account. In some instances, each of the authorized users may be assigned a unique user identification and/or a passcode. In some instances, different authorized users may be identified and given different levels of authority to make changes to the subsystems. For example, a child or a guest may be granted a lower level of authority than a head of the household.

FIG. 1 shows an example of a system for coordinated control of various subsystems in a structure according to embodiments of the disclosed subject matter. For example the system of FIG. 1 may disclose a premises management system for controlling subsystems in a premises. In implementations of the disclosure, components of the system shown in FIG. 1 may be located within or in communication with components located within a premises such as a home and implemented within computing devices, sensors, and networks such as those described with respect to FIGS. 3-5. The system may include a controller 102, which includes a module 104 for determining location, occupancy, or identity of authorized users and a module 106 for determining a structure mode, whether the structure mode is a home mode 108 or an away mode 110. In some implementations, the user may be requested to make a manual input to change the structure mode between the home mode and the away mode, or to confirm the existing structure mode. In some implementations, the module 106 may determine the structure mode automatically. In some implementations, the module 104 may also be configured to determine parameters associated with usage or occupancy of the home, including, for example, whether the users are shopping or running errands nearby, whether the users are taking a short or long vacation away from home, and so on. In some implementations, the module 106 may also be configured to determine or to estimate the intent of the users, for example, whether the users intend to return home in the near future or not to return home for a long period of time, in addition to determining whether the structure mode is the home mode or the away mode. In the example shown in FIG. 1, the controller 102 is communicably coupled to an HVAC subsystem 112, a camera subsystem 114, and a security subsystem 116. In some implementations, the camera subsystem 114 may be coupled to the security subsystem 116. In some implementations, the camera subsystem may be considered as part of the security subsystem, which may include additional monitoring functions such as fire, smoke, or toxic gas monitoring, as well as other types of sensors to detect intrusion. Various other types of electronic devices or systems in a home environment may also be controlled by the controller 102 in a similar manner.

In some implementations of the disclosure, a user may provide input to the system disclosed in FIG. 1 via a user interface of a mobile device in communication with the system. For example, a computing device such as is disclosed with respect to FIG. 3. may include in interface via which a user may manually select among structure modes.

Figure 2:
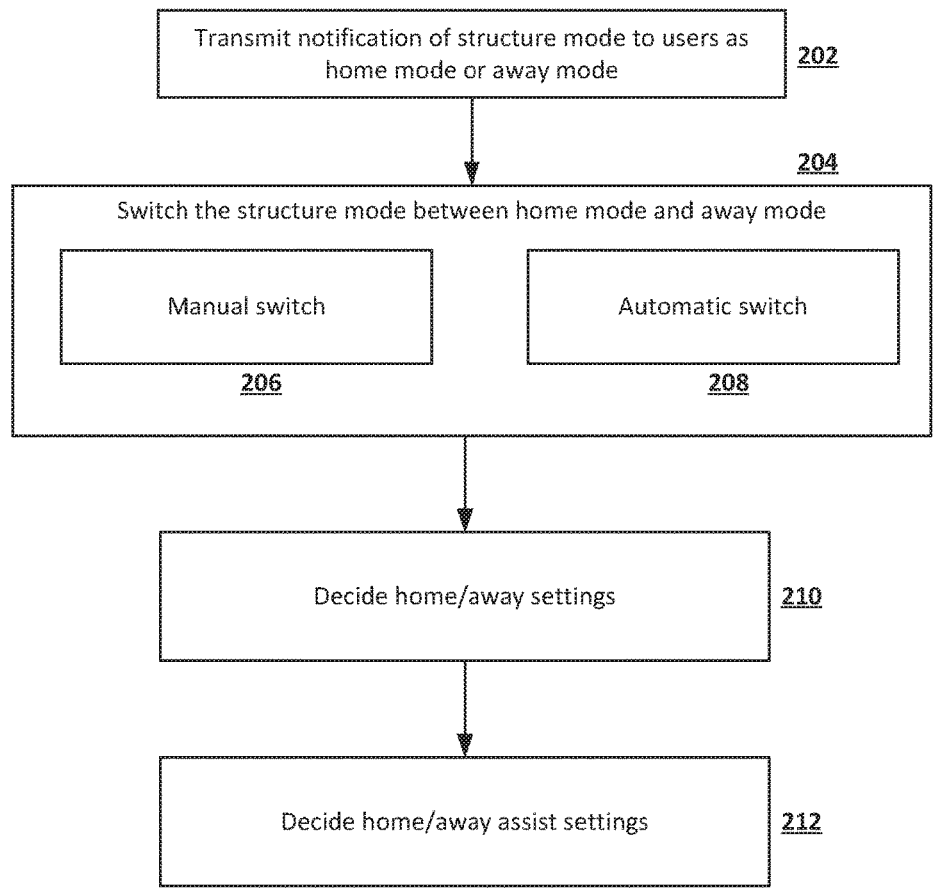
FIG. 2 shows an example of a process of controlling various subsystems in a structure according to embodiments of the disclosed subject matter.

FIG. 2 shows an example of a process of controlling various subsystems in a structure according to embodiments of the disclosed subject matter. The system notifies one or more authorized users that the structure mode for the home environment is the home mode or the away mode in block 202. For example, notifications of the structure mode may be provided periodically according to a schedule or predetermined event to a user device in communication with a premises management system such as that disclosed with respect to FIG. 1. As another example, notification may be provided to the user device in response to a request for a status update provided by the user device. In some implementations, the structure mode may be communicated to the user by displaying a text, a symbol, an icon, a picture, or the like, on a mobile device such as a smart phone or tablet computer, for example. In some implementations, audio signals such as a voice, a beep, or a buzz may be transmitted to the user in addition or as an alternative to a visual notification of the structure mode. In some implementations, vibratory or haptic signals may be generated by the mobile device to alert the user to view the structure mode for the home environment on the mobile device. In some implementations, the structure mode may be displayed on the mobile device through an application user interface (API), which may be a standard, non-standard, open-source, or proprietary API. In some implementations, the structure mode may be presented to the user on the mobile device through a mobile application.

In some implementations, the process shown in FIG. 2 may execute on controller 102 or on a remote system 74 such as a server as shown in FIG. 5. In general, the process may execute on any computing device, such as computing device 20, that is suitable for the purposes of the disclosure.

In some implementations, information in addition to an indication as to whether the home environment is in a home mode or an away mode may be included in the structure mode. For example, for an HVAC subsystem, such additional information may include histories of energy usage in different modes of HVAC operations, including, for example, prior use of an economy mode which may entail lower energy usage but less comfortable temperatures for occupants, or a comfort mode which may entail more comfortable temperatures for occupants but higher energy usage. For a security subsystem, different security levels such as SL0, SL1, or SL2 may also be communicated to the user through the mobile device.

After the user is notified of the structure mode in block 202, the existing structure mode may be switched between the home mode and the away mode in block 204. The structure mode may be switched manually as shown in block 206 or automatically as shown in block 208. In some implementations, the system may request the user to make an input on the mobile device to switch the structure mode between the home mode and the away mode before it decides to perform mode switch automatically. In some implementations, the system may wait for user input on the user device for a finite amount of time, for example, 30 seconds or one minute, before it decides automatically whether to switch the structure mode from the home mode to the away mode or vice versa.

In some implementations, the user may be allowed to change the structure mode between the home mode and the away mode by making an input on the mobile device, for example, by touching a soft button or an icon on the touch screen, or by a voice command. Various types of APIs may be implemented on mobile devices to allow users to switch between the home mode and the away mode in various manners. A mobile application may be installed on a mobile device to allow user input to switch between the home mode and the away mode manually. In some implementations, identification and/or authentication techniques may be included in the mobile application to verify that the person making the input on the mobile device is an authorized user. For example, the user may be asked to enter a passcode before the user is allowed to change the structure mode from the home mode to the away mode or vice versa. In another example, the mobile device may perform a fingerprint scan to verify that the person attempting to change the structure mode is an authorized user. In another example, the mobile device may include a camera which may take a picture of a person's face or perform a retina scan to determine if that person is an authorized user. Various other techniques of user verification and/or authentication may be used within the scope of the disclosed subject matter.

In some implementations, the system may perform automatic switching of the structure mode based on one or more criteria if it receives no manual response from the user within a finite amount of time, for example, 30 seconds or one minute, or in some instances, without waiting for a manual response from the user. The decision for automatically changing the structure mode from the home mode to the away mode or vice versa may be based on one or more criteria including, for example, the types of products installed in the home environment, existing settings or modes for the products, the current states of the products, for example, indications of whether a camera is on or off, whether a security system is armed or unarmed, whether an HVAC system is in a heater mode, an air conditioner mode, a fan-only mode, or an off mode, or the like. The criteria for automatic switching of the structure mode may also include the state of occupancy of the home environment based on detections by sensors, including cameras, of humans or pets, and past manual changes to the structure mode, if any, that may be indicative of a pattern of human intervention in setting the states of various subsystems, for example. The state of occupancy of the home environment may be determined based on other indications, for example, whether certain appliances or electronic devices are turn on, such as a stove or a television set.

Some or all of the subsystems in the home environment may react to the change of the structure mode from the home mode to the away mode or vice versa in certain manners. For example, when the structure mode is in an away mode, an HVAC subsystem may be set in an economy mode to conserve energy while the home is unoccupied. In some implementations, when the structure is in an away mode the security subsystem can operate under the assumption that no authorized parties are in the premises; therefore security subsystem settings can be adjusted to cause data from all sensors, interior and exterior, can be accorded high weight in determining whether an unauthorized party is present.

On the other hand, in implementations of the disclosure, when the structure mode is in a home mode, the HVAC subsystem may be set in a comfort mode to maintain a comfortable temperature even if it entails more energy consumption. In some implementations, when the structure mode is in a home mode the security subsystem can operate under the assumption that authorized parties are within the premises and will be freely entering/leaving the premises without notifying the system; therefore security subsystem settings can cause data from certain sensors interior and exterior can be accorded low weight in determining whether an unauthorized party is present. In another example, a security subsystem may be set in the SL0 mode or SL1 mode when the structure mode is in a home mode, and may be switched to the SL2 mode when the structure mode is in an away mode.

In some implementations, a subsystem may react to a change to the structure mode regardless of whether the change is automatic or manual. In some instances, even if the structure mode is changed automatically, some states or settings in a subsystem may require manual authorization by a user. For example, a security system may include an automatic locking feature. To prevent intended locking of an occupant inside a home, for example, the system may request permission before it locks doors and windows of the home. The system may request permission to lock the doors and windows from an authorized user, such as a family member or a head of the household, through an auto-ask feature presented as an application on a mobile device, for example. It should be understood that these modes are merely examples and can be modified, removed, or supplemented by other modes. In some implementations, the security subsystem may execute as a component of the premises management system, and thus these modes may be modes of the premises management system and function similarly.

In FIG. 2, after the structure mode is switched between the home mode and the away mode, either manually or automatically, as shown in block 206 or 208, home or away settings for the individual subsystems may be decided in block 210. For example, a home security subsystem may include various devices that provide various types of inputs. As a specific example, a home security subsystem may include one or more temperature sensors, one or more smoke detectors, one or more toxic gas detectors such as carbon monoxide detectors, intrusion sensors on doors and windows, motion detectors, infrared sensors, or the like. Some sensors may be set in an off or on state or at different levels of sensitivity, based on whether the structure mode is a home mode or an away mode. Some of the sensors, such as the smoke detector, may remain in a constant on state regardless of whether the structure mode is in a home mode or an away mode.

In some implementations, the home or away settings may include setting for a geo-fence, which is a virtual or invisible geographic barrier or boundary defined by radio or wireless techniques, such as the global positioning system (GPS) or radio frequency identification (RFID). A secured area may be defined by a number of virtual boundaries. After the virtual boundaries are established, the system may be set up to transmit an alert, which may be in the form of a text message, an email alert, or a notification by a mobile application, when a mobile device crosses a virtual boundary or enters or exits a specified area defined by virtual boundaries. In some implementations, the default setting for geo-fence monitoring may be in an off mode, and the user may be prompted to set geo-fence monitoring in an on mode manually if the structure mode is changed, either manually or automatically. In some implementations, if one of the authorized users, such as a family member, sets geo-fence monitoring in an on mode, the main user, such as the head of the household, may be prompted to confirm or to reject the on-mode setting, to avoid false alarms. In some implementations, geo-fence monitoring may be switched on or off automatically as part of home or away settings based on whether the structure mode is home or away if the probability of triggering false alarms is acceptably low.

In addition to deciding home or away settings for individual subsystems in block 210, home or away assist settings may be decided for some of the subsystems in block 212. In some implementations, default home or away assist settings may be provided for some of the subsystems, and the user may change the default settings. For example, the home or away assist setting for an HVAC subsystem may be in a default setting of an economy mode to conserve energy when the structure mode is an away mode. However, this default setting may be changed by the user to a comfort mode if the outside temperature is extremely hot or cold and the house is desired to be at a certain temperature when the user returns home. In some instances, the default home or away assist setting for the HVAC subsystem may be a comfort mode if a family pet is expected to remain in the house. In another example, the default setting for cameras may be on for the cameras only if all occupants are away from home. If one or more family members are inside the home, then the default setting for the cameras may be off. In some instances, the users may set the home or away assist setting for the camera subsystem to an off mode for privacy reasons if they are concerned about the possibility of someone else watching streaming video from the camera subsystem even if the video is transmitted on a secured wireless channel. In some instances, the users may set one or more of the cameras, for example, a camera in the basement, to an on mode, even if the home is occupied.

In some implementations, the camera or security subsystem also may have a default home or away assist setting of automatically transmitting a notification to mobile devices of all authorized users when the last user has left the house. This default setting may be manually reset by the user. In some implementations, the camera subsystem may be able to identify authorized occupants or users, and may have a setting of transmitting a notification to the mobile devices of authorized users if the last authorized user has left home, and another notification to the mobile devices if an unidentified person enters the home.

In one example described above, the security subsystem may have three security level settings, SL0, SL1 and SL2. In some implementations, the default home or away assist setting for the security subsystem may be SL0 when the structure mode is a home mode, or SL2 when the structure mode is an away mode. The user may manually change the default home or away assist setting for the security subsystem to the intermediate security level, SL1, if there are occupants at home but the occupants are not expected to leave. The user may manually reset the security level to SL0 before someone leaves home to avoid triggering a false alarm.

In some implementations, the structure mode may be manually changed even if some or all of the devices or subsystems in the structure are offline. In some implementations, a notification may be transmitted by the mobile device to alert the user that some of the subsystems or devices have not reacted properly in response to a change in the structure mode. If some of the subsystems are online while others are offline, a change in the structure mode may cause changes in the home or away settings or home or away assist settings for the subsystems that are online while not affecting the states or settings of the subsystems that are offline. A subsystem may be operating even though if it is offline. An offline subsystem may be controlled locally. For example, an HVAC subsystem may have a wall-mounted thermostat that controls the temperature setting, and a security subsystem may have a wall-mounted keypad or control panel to allow users to arm, partially arm, or disarm the security subsystem even if these subsystems are offline and do not respond to changes in the structure mode.

In some implementations, authentication may be required from an authorized user before any manual changes can be made to the structure mode. In some implementations, authentication may be required before particular settings for subsystems, for example, some of the home or away settings or home or away assist settings for a subsystem, are manually changed. For example, a change to the economy or comfort mode setting or the temperature setting for an HVAC subsystem may not need authentication, whereas a change to a security level setting for a security subsystem may require authentication. In some implementations, when the system detects an attempt to change the structure mode without having passed an authentication test, the change to the structure mode may affect some of the subsystems, such as the HVAC subsystem, but not other subsystems, such as the security subsystem. In some implementations, an authorized user may change the structure mode for all subsystems in the home environment by changing the security level for the security subsystem between SL0, SL1, and SL2. For example, when the user sets the security level to the highest level, SL2, which corresponds to the fully armed mode, then the controller for all subsystems may set the structure mode to the away mode. On the other hand, when the user sets the security level to the lowest level, SL0, then the controller may set the structure mode to the home mode. In some implementations, upon detecting that the user has changed the security level for the security system, the controller may request that the user select whether to change the structure mode from the home mode to the away mode or vice versa, instead of automatically changing the structure mode without confirmation.

In some implementations, the structure mode may include structure modes in addition to the home mode and the away mode. For example, om addition to the home and away modes, structure modes can include "stay", "vacation", and "sleep" modes. Changes among these structure modes may operate to change settings of one or more subsystems in just as changes among home and away modes change settings of one or more subsystems.

According to implementations of the disclosure, in a "stay" mode the security subsystem can operate under the assumption that authorized parties are present within the premises but will not be entering/leaving without notifying the system; therefore settings may be adjusted to cause data from certain interior sensors in communication with a security subsystem to be given lower weight in determining whether an unauthorized party is present. In a "vacation" mode the security subsystem can operate under the assumption that no authorized parties are in the premises during a specified period of time and/or with the exception of certain specified parties such as pet sitters or house-watchers; therefore security subsystem settings can be adjusted to cause data from all sensors, interior and exterior in communication with the security subsystem to be accorded high weight in determining whether an unauthorized party is present during the specified period of time with limited exceptions for parties having specific authenticating or other identifying information. In a "sleep" mode the security subsystem can operate under the assumption that authorized parties are within the premises and will not be freely entering/leaving the premises without notifying the system; however because the occupants may not be conscious, security subsystem settings can be adjusted to cause data from certain interior sensors in communication with the security subsystem to be accorded low weight but certain exterior sensors to be accorded high weight in determining whether an unauthorized party is present.

It should be understood that the above modes are merely examples and can be modified, removed, or supplemented by other modes. Changes among the stay, vacation, sleep, home, and away structure modes may cause changes to one or more of various subsystems or components disclosed herein. These subsystems or component changes may include changes to the same or additional subsystems and components that are caused by changes between the home and away structure modes. For example, a security subsystem may be set in the SL0 mode or SL1 mode when the structure mode is in a home mode or a stay mode, and may be switched to the SL2 mode when the structure mode is in an away mode, a vacation mode, or a sleep mode.

Figure 3:
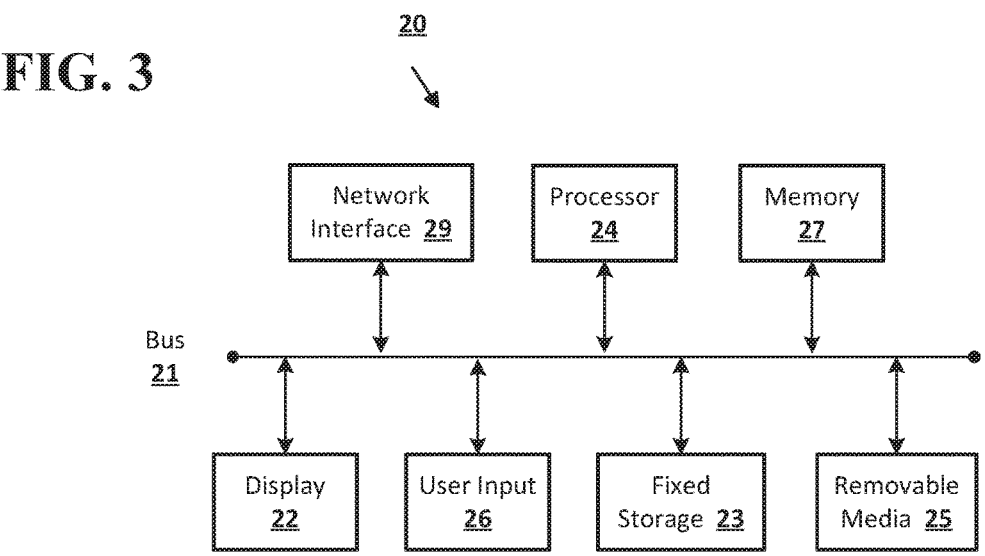
FIG. 3 shows an example of a computing device according to embodiments of the disclosed subject matter.

Embodiments of the presently disclosed subject matter may be implemented in and used with a variety of component and network architectures. For example, the system for coordinated control of various subsystems in a home environment, such as HVAC, camera or security systems, may include one or more computing devices for implementing embodiments of the subject matter described above. FIG. 3 shows an example of a computing device 20 suitable for implementing embodiments of the presently disclosed subject matter. The device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, removable media 25, or on a remote storage location.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor or an Application Specific Integrated Circuit (ASIC) that embodies all or part of the techniques according to embodiments of the disclosed subject matter in hardware or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

In some embodiments, at least some of the subsystems may include one or more sensors. These sensors may include microphones for sound detection, for example, and may also include other types of sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, entry, presence, pressure, light, sound, and the like. A sensor also may be described in terms of the particular physical device that obtains the environmental information. For example, an accelerometer may obtain acceleration information, and thus may be used as a general motion sensor or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. A sensor also may be described in terms of a function or functions the sensor performs within an integrated sensor network, such as a smart home environment. For example, a sensor may operate as a security sensor when it is used to determine security events such as unauthorized entry. A sensor may operate with different functions at different times, such as where a motion sensor is used to control lighting in a smart home environment when an authorized user is present, and is used to alert to unauthorized or unexpected movement when no authorized user is present, or when an alarm system is in an "armed" state, or the like. In some cases, a sensor may operate as multiple sensor types sequentially or concurrently, such as where a temperature sensor is used to detect a change in temperature, as well as the presence of a person or animal. A sensor also may operate in different modes at the same or different times. For example, a sensor may be configured to operate in one mode during the day and another mode at night. As another example, a sensor may operate in different modes based upon a state of a home security system or a smart home environment, or as otherwise directed by such a system.

In general, a sensor as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, or other sensors. Such a housing also may be referred to as a sensor or a sensor device. For clarity, sensors are described with respect to the particular functions they perform or the particular physical hardware used, when such specification is necessary for understanding of the embodiments disclosed herein.

A sensor may include hardware in addition to the specific physical sensor that obtains information about the environment. FIG. 4 shows an example of a sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, pressure sensor, microphone, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. Furthermore, the sensor 60 may include one or more microphones 66 to detect sounds in the environment. One or more components may be implemented in a single physical arrangement, such as where multiple components are implemented on a single integrated circuit. Sensors as disclosed herein may include other components, or may not include all of the illustrative components shown.

Sensors as disclosed herein may operate within a communication network, such as a conventional wireless network, or a sensor-specific network through which sensors may communicate with one another or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another. FIG. 5 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

The sensor network shown in FIG. 5 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 5 may include a plurality of devices, including intelligent, multi-sensing, network-connected devices, that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 5.

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Moreover, the smart-home environment may make inferences about which individuals live in the home and are therefore users and which electronic devices are associated with those individuals. As such, the smart-home environment may "learn" who is a user (e.g., an authorized user) and permit the electronic devices associated with those individuals to control the network-connected smart devices of the smart-home environment, in some embodiments including sensors used by or within the smart-home environment. Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services or communication protocols.

A smart-home environment may include communication with devices outside of the smart-home environment but within a proximate geographical range of the home. For example, the smart-home environment may communicate information through the communication network or directly to a central server or cloud-computing system regarding detected movement or presence of people, animals, and any other objects and receives back commands for controlling the lighting accordingly.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of controlling a plurality of subsystems in a structure, the method comprising:
   transmitting a notification to a user device, wherein the notification includes an option to select a structure mode from the group consisting of a home mode and an away mode;
   receiving, in response to the notification, a selection of the structure mode between the home mode and the away mode;
   determining one or more settings of one or more of the plurality of subsystems based on whether the structure mode is the home mode or the away mode; and
   in response to the structure mode selection between the home mode and the away mode, receiving, at the user device, a selection of a home assist setting or an away assist setting, and changing a default setting of the home assist setting or the away assist setting of the one or more of the plurality of subsystems by adjusting an operation of the one or more of the plurality of subsystems.

2. The method of claim 1, wherein the one or more settings of the one or more of the plurality of subsystems comprise one or more home or away settings.

3. The method of claim 1, wherein the received selection of the structure mode comprises automatically changing the structure mode between the home mode and the away mode.

4. The method of claim 1, wherein the received selection of the structure mode comprises transmitting a request to the user device to change the structure mode.

5. The method of claim 1, wherein the plurality of subsystems comprise at least one subsystem selected from the group consisting of a heating, ventilation and air conditioning subsystem, a camera subsystem, and a security subsystem.

6. An apparatus for controlling a plurality of subsystems in a structure, the apparatus comprising:
   a processor, and
   a non-transitory, computer readable medium communicably coupled to the processor and storing instructions that, when executed by the processor, cause the processor to perform operations comprising:
      transmitting a notification to a user device, wherein the notification includes an option to select a structure mode from the group consisting of a home mode and an away mode;
      receiving, in response to the notification, a selection of a structure mode between the home mode and the away mode;
      determining one or more settings of one or more of the plurality of subsystems based on whether the structure mode is the home mode or the away mode; and
      in response to the structure mode selection between the home mode and the away mode, receiving, at the user device, a selection of a home assist setting or an away assist setting, and changing a default setting of the home assist setting or the away assist setting of the one or more of the plurality of subsystems by adjusting an operation of the one or more of the plurality of subsystems.

7. The apparatus of claim 6, wherein the one or more settings of the one or more of the plurality of subsystems comprise one or more home or away settings.

8. The apparatus of claim 6, wherein the received selection of the structure mode comprises changing the structure mode automatically between the home mode and the away mode.

9. The apparatus of claim 6, wherein the received selection of the structure mode comprises transmitting a request to the user device to change the structure mode between the home mode and the away mode.

10. The apparatus of claim 6, wherein the plurality of subsystems comprise at least one subsystem selected from the group consisting of a heating, ventilation and air conditioning subsystem, a camera subsystem, and a security subsystem.

11. A system, comprising:
    a plurality of subsystems in a structure; and
    a controller communicably coupled to the plurality of subsystems, the controller comprising a processor and a non-transitory, computer readable medium communicably coupled to the processor and storing instructions that, when executed by the processor, cause the processor to perform operations comprising:
       transmitting a notification to a user device, wherein the notification includes an option to select a structure mode from the group consisting of a home mode and an away mode;
       receiving, in response to a notification, a selection of the structure mode between the home mode and the away mode;
       determining one or more settings of one or more of the plurality of subsystems based on whether the structure mode is the home mode or the away mode; and
       in response to the structure mode selection between the home mode and the away mode, receiving, at the user device, a selection of a home assist setting or an away assist setting, and changing a default setting of the home assist setting or the away assist setting of the one or more of the plurality of subsystems by adjusting an operation of the one or more of the plurality of subsystems.

12. The system of claim 11, wherein the one or more settings of the one or more of the plurality of subsystems comprise one or more home or away settings.

13. The system of claim 11, wherein the received selection of the structure mode comprises changing the structure mode automatically between the home mode and the away mode.

14. The system of claim 11, wherein the received selection of the structure mode comprises transmitting a request to the user device to change the structure mode between the home mode and the away mode.

15. The system of claim 11, wherein the plurality of subsystems comprise at least one subsystem selected from the group consisting of a heating, ventilation and air conditioning subsystem, a camera subsystem, and a security subsystem.

16. The system of claim 11, wherein the operations further comprise:
    prior to receiving the selection of the structure mode, receiving by the system from the user device, an instruction to change a setting for a particular home or away assist setting for a particular subsystem of the plurality of subsystems; and
    changing the particular home or away assist setting, wherein the selection of the structure mode is in response to the change of the particular home or away assist setting.

17. The system of claim 16, wherein:
    the particular subsystem comprises a security system;
    the particular home or away assist setting comprises a highest security level setting of a plurality of security level settings of the security system; and the selection of the structure mode comprises changing the structure mode to an away mode.

* * * * *